United States Patent
Lakshmikathan et al.

(10) Patent No.: US 7,986,667 B2
(45) Date of Patent: Jul. 26, 2011

(54) FORWARDING DATA PATH OPTIMIZATION IN A DISTRIBUTED ENVIRONMENT FOR ACHIEVING MICRO-MOBILITY

(75) Inventors: Ramanathan Lakshmikathan, Milpitas, CA (US); Pritam Baruah, San Jose, CA (US)

(73) Assignee: Ericsson AB, Stockholm (SE)

(*) Notice: Subject to any disclaimer, the term of this patent is extended or adjusted under 35 U.S.C. 154(b) by 943 days.

(21) Appl. No.: 11/975,486

(22) Filed: Oct. 19, 2007

(65) Prior Publication Data

US 2009/0103490 A1 Apr. 23, 2009

(51) Int. Cl.
*H04W 4/00* (2009.01)
(52) U.S. Cl. .......................... 370/331; 455/436
(58) Field of Classification Search .................. None
See application file for complete search history.

(56) References Cited

U.S. PATENT DOCUMENTS

| | | | |
|---|---|---|---|
| 6,490,259 B1* | 12/2002 | Agrawal et al. | 370/331 |
| 2006/0013226 A1 | 1/2006 | Ervin et al. | |
| 2007/0087752 A1* | 4/2007 | Voyer et al. | 455/436 |
| 2007/0115990 A1 | 5/2007 | Asati et al. | |
| 2007/0147320 A1 | 6/2007 | Sattari et al. | |
| 2008/0151815 A1* | 6/2008 | Bedekar et al. | 370/328 |
| 2008/0232272 A1* | 9/2008 | Gelbman et al. | 370/254 |
| 2009/0238145 A1* | 9/2009 | Shahrier et al. | 370/331 |
| 2009/0323631 A1* | 12/2009 | Bajic | 370/331 |

OTHER PUBLICATIONS

PCT International Search Report and Written Opinion for PCT International Appln No. PCT/US08/80384 mailed Jan. 6, 2009. (11 pages).

* cited by examiner

*Primary Examiner* — Min Jung
(74) *Attorney, Agent, or Firm* — Blakely Sokoloff Taylor & Zafman, LLP

(57) ABSTRACT

A method and apparatus of updating a forwarding plane of a network element in response to receiving a mobility event is described. The network element receives a mobility message indicating a mobile node has coupled to a new access port associated with the network element. The message further indicates that the mobile node moved from an old access port to a new access port. The network element adds an entry in a forwarding table of the old egress engine to redirect a set of packets destined to the mobile node to a new egress engine, where the new egress engine is associated with the new access port. Furthermore, the network element redirects the set of packet from the old egress engine to the new egress engine.

15 Claims, 10 Drawing Sheets

FORWARDING DATA PATH OPTIMIZATION IN A DISTRIBUTED ENVIRONMENT FOR ACHIEVING MICRO-MOBILITY

CROSS-REFERENCE TO RELATED APPLICATIONS

N/A

BACKGROUND

1. Field

Embodiments of the invention relate to the field of computer networking; and more specifically, to optimizing forwarding data paths supporting mobile nodes.

2. Background

A mobile network is one that supports users with mobile nodes staying connected to the mobile network as the users move their mobile nodes to different points along the mobile network. FIG. 1 illustrates one embodiment of a mobile network 100. While in one embodiment, mobile network 100 supports a Worldwide Interoperability for Microwave Access (WiMAX), in alternate embodiments, mobile network 100 supports the same and/or different wireless and wired access technologies known in the art (802.11, Ethernet, optical fiber, copper, Digital Subscriber Line (DSL), Asynchronous Transfer Mode (ATM), etc.). In FIG. 1, mobile nodes 102A-B couple to base station systems (BSS) 104A-B over an air interface known in the art (WiMAX, 802.11a/b/g/n, etc.). BSS 104A-B couple to foreign agent/access services network gateway (FA/ASN-GW) 106. In one embodiment, BSS 104A-B couple to FA/ASN-GW 106 through a layer 2 or layer 3 network. FA/ASN-GW 106 further couples to home agent/core services network (HA/CSN) 108, which couples to Internet/Core Network 110. In an alternative embodiment, BSS 104A-B can couple to HA-CSN 108 in addition and/or in lieu of coupling to FA/ASN-GW 106 (not shown).

Typically, a mobile node registers with the mobile network 100 in order to use this network. In one embodiment, mobile nodes 102A-B register with FA/ASN-GW 106 through a protocol known in the art that provides mobile connectivity (Mobile-Internet Protocol (Mobile-IP), etc.). In one embodiment, mobile node 102A-B sends a registration request (RRQ) to FA/ASN-GW 106, which forwards this request to HA/CSN 108. HA/CSN 108 responds with a registration reply which FA/ASN-GW 106 forwards to the mobile node. Receiving the reply completes the registration process. FA/ASN-GW 106 installs a route towards the mobile node with access port information. The access port (not shown) is the link on which the RRQ arrived. The ingress engine installs the route installed in the respective forwarding information base (FIB) with a key representing the mobile node on the egress line card. The egress engine has an egress key on the access port that represents information on how to reach the mobile node. While in one embodiment, the key is a lookup handle that is used to lookup in a table, in alternate embodiment the key can be some other way to identify information of a mobile node stored in the ingress and/or egress engines. While in one embodiment the information in the egress key is layer-2 information, in alternate embodiments the information is the same and/or different (layer-3 information, tunnel information, line-card slot information, encapsulation information, etc.).

In one embodiment, mobiles node 102A-B can change BSS 104A-B because mobile nodes 102A-B are mobile and do not typically get access to core network 110 through the same BSS 104A-B. Two types of mobility events can be defined within mobile network 100. Macro-mobility (not shown) is when mobile node 102A-B moves between BSS 104A-B coupled to different FA/ASN-GW 106. Micro-mobility occurs when a mobile node 102A-B moves between different BSS 104A-B within the domain of a single FA/ASN-GW 106. In one embodiment, a micro-mobility event occurs when mobile node 102A changes coupling from BSS 104A to BSS 104B.

Mobility events are dispatched by the forwarding plane of FA/ASN-GW 106 to the FA/ASN-GW 106 control plane. This control plane reprograms the forwarding plane so that data traffic destined for the mobile node causing the mobility event is appropriately forwarded by the forwarding plane of FA/ASN-GW 106. However, interactions between the control plane and forwarding plane of FA/ASN-GW 106 can introduce considerable delay to the response time for the mobility event, such as multiple levels of interprocess communications, latency in the kernels managing the forwarding and control planes, cleanup of the forwarding state, time take to program the forwarding plane, etc. Furthermore, higher rates of mobility events can causes a higher strain on system resources because of the factors mentioned above. Delays in mobility event response can lead to disruption of data traffic forwarding to and/or from mobile nodes 102A-B.

BRIEF SUMMARY

A method and apparatus of updating a forwarding plane of a network element in response to receiving a mobility event is described. The network element receives a mobility message indicating a mobile node has coupled to a new access port associated with the network element. The message further indicates that the mobile node moved from an old access port to a new access port. The network element adds an entry in a forwarding table of the old egress engine to redirect a set of packets destined to the mobile node to a new egress engine, where the new egress engine is associated with the new access port. Furthermore, the network element redirects the set of packet from the old egress engine to the new egress engine.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given element in a Figure is associated with the number of the Figure. However, element numbers are the same for those elements that are the same across different Figures. In the drawings.

DETAILED DESCRIPTION

Figure 1:
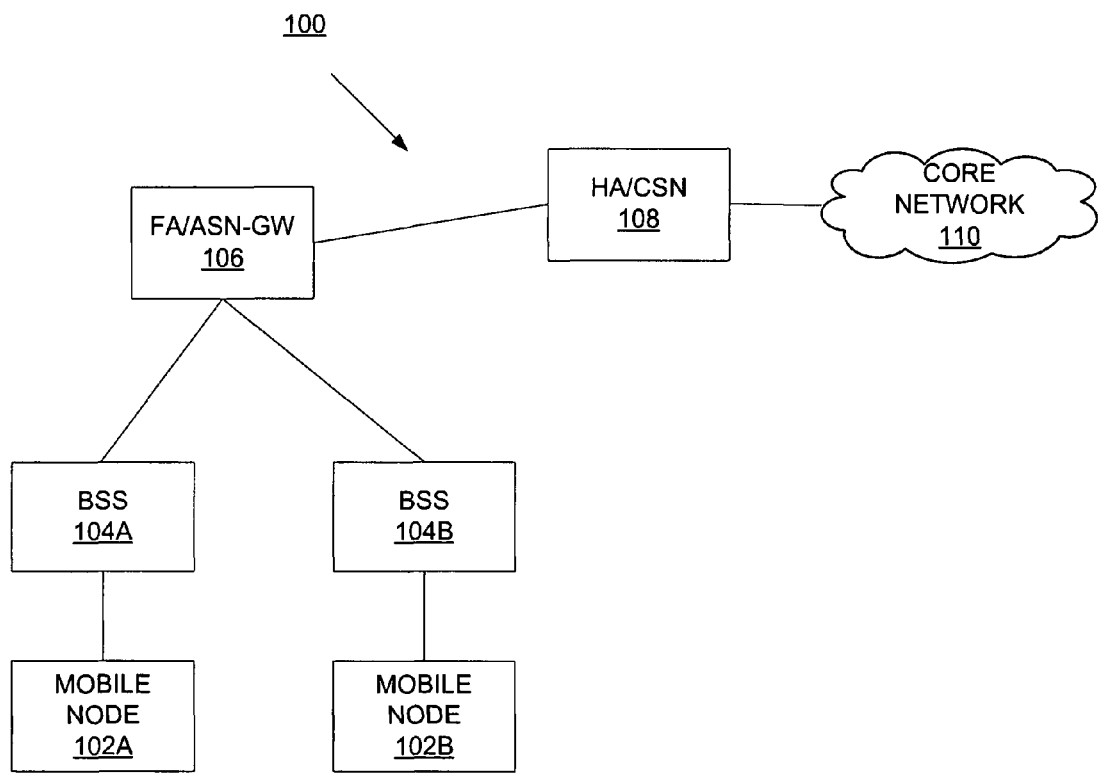
FIG. 1 (Prior Art) illustrates one embodiment of network that supports mobility.

In the following description, numerous specific details such as network element, line card, mobility event, ingress/egress engine, packet, mobile node, controller card, and inter-relationships of system components are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other. Exemplary embodiments of the invention will now be described with reference to FIGS. 2-10. In particular, the operations of the flow diagrams in FIGS. 2 and 4-8 will be described with reference to the exemplary embodiments of FIGS. 3 and 9-10. However, it should be understood that the operations of these flow diagrams can be performed by embodiments of the invention other than those discussed with reference to FIGS. 3 and 9-10 and that the embodiments discussed with reference to FIGS. 3 and 9-10 can perform operations different than those discussed with reference to these flow diagrams.

A method and apparatus for optimizing a forwarding data path in a distributed environment for achieving micro-mobility is described. According to one embodiment of the invention, a network element receives a mobility message that indicates a mobile node has changed access ports. The ingress engine associated with the new access port receives the message and sends a forwarding message to the egress engine associated with the old access port. The forwarding message indicates the packets destined for the mobile node be redirected to the new egress engine associated with the new access port. The old egress engine modifies its forwarding table to redirect packets destined for the mobile node to the new egress engine. The new egress engine forwards those packets to the mobile node via the new access port.

Figure 2:
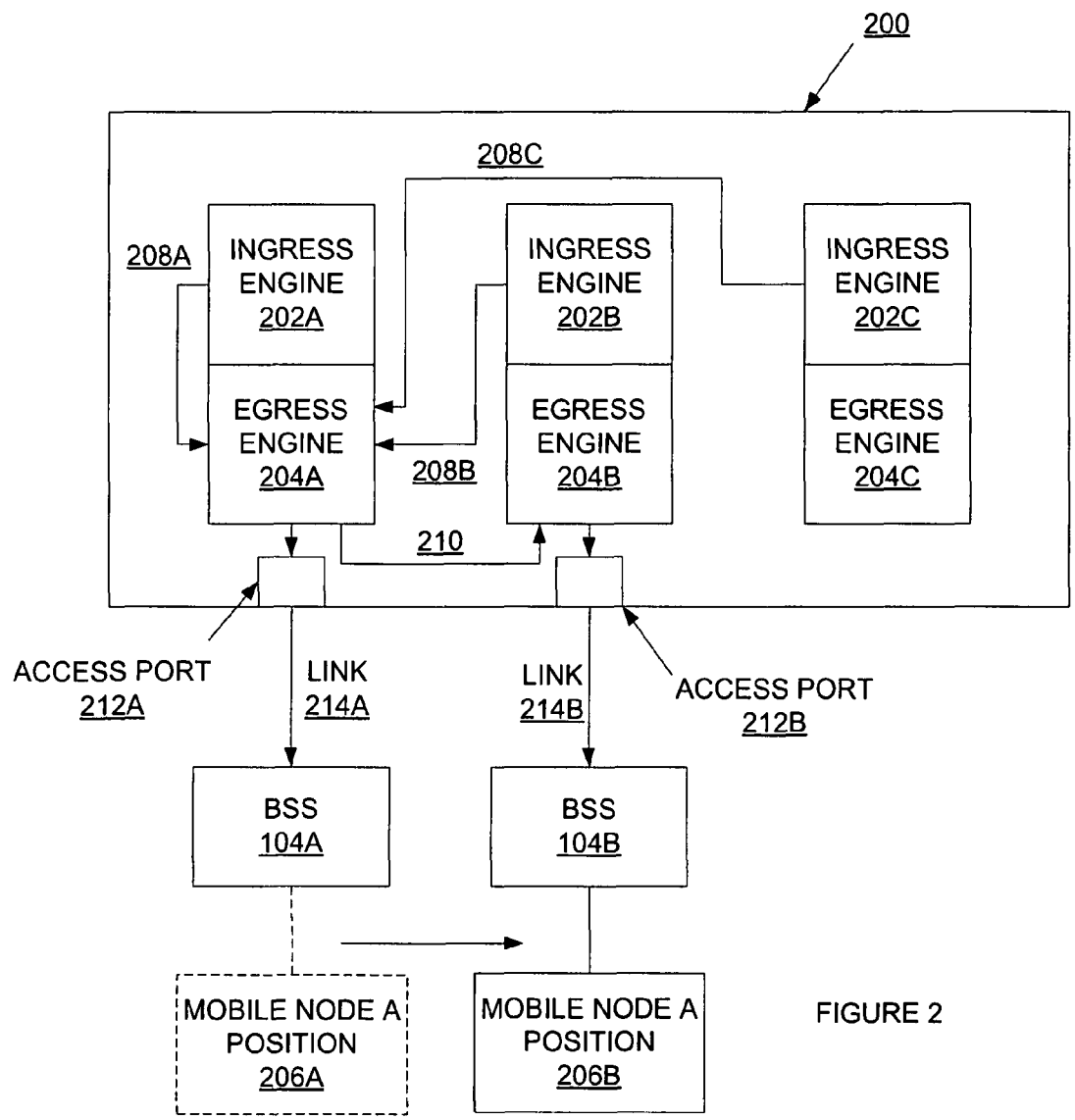
FIG. 2 is a block diagram illustrating a FA/ASN-GW handling a micro-mobility event according to one embodiment of the invention.

FIG. 2 is a block diagram illustrating a FA/ASN-GW forwarding plane 200 handling a micro-mobility event according to one embodiment of the invention. In one embodiment, FA/ASN-GW forwarding plane 200 is the forwarding plane of FA/ASN-GW 106. In FIG. 2, FA/ASN-GW 200 comprises ingress engines 202A-C and egress engines 204A-C. While in one embodiment, FA/ASN-GW forwarding plane 200 comprises the three ingress and egress engines, in alternate embodiments, FA/ASN-GW forwarding plane 200 can comprises the same, more, less, and/or different numbers of ingress and egress engines. Furthermore, while in one embodiment, the ingress and egress engines are separate packet processors, in alternate embodiments, the ingress and egress engines can be the same packet processor.

In addition, egress engines 204A-B couple to BSS 104A-B with links 214A-B via access ports 212A-B, respectively. While in one embodiment, links 214A-B is a layer-2 link, such as Ethernet, etc., in alternate embodiments, links 214A-B can be different types of links known in the art (layer-3, wireless, optical, Asynchronous Transfer Mode (ATM), Synchronous Optical Network (SONET), etc.). BSS 104A-B couple to mobile node 206A over an air interface (WiMAX, 802.11a/b/g/n, etc.).

While mobile node A is in position 206A, FA/ASN-GW forwarding plane 200 forwards packets to mobile node A with egress engine 204A through access port 212A via link 214A and BSS 104A. Ingress engines 202A-C process packets destined for mobile node A by forwarding the packets to egress engine 204A. For example and by way of illustration, ingress engines 202A-C forwards packets for mobile node A using paths 208A-C, respectively.

Because mobile node A can access the network from different BSS, mobile node A couples to potentially several different BSS. For example and by way of illustration, mobile node A couples to BSS 104A at position 206A (shown in phantom) and moves to position 206B, where mobile node A couples to BSS 104B. The coupling of mobile node A to BSS 104B triggers a mobility event. FA/ASN-GW forwarding plane 200 handles the mobility event by reprogramming forwarding path between the egress engines. In one embodiment, egress engine 204A forwards packets destined for mobile node A in position 206B to egress engine 204B. Egress engine 204B forwards these packets to mobile node A in position 206B through access port 212B. In another embodiment, egress engine 204A forwards packets destined for mobile node A in position 206B to egress engine 204B through intervening ingress engines (not shown). For example and by way of illustration, this embodiment can occur when there is not a direct backplane connection between egress engines 204A-B.

In this embodiment, this path change to the forwarding plane enables the appropriate forwarding of the packets destined mobile node A when this node has changed accessing of the network from BSS 104A and access port 212A to BSS 104B and access port 212B. Furthermore, this change setups a transient forwarding state that correctly forwards traffic until the control plane of FA/ASN-GW 106 reprograms FA/ASN-GW forwarding plane 200. In another embodiment, FA/ASN-GW forwarding plane 200 adds one or more forwarding paths between egress engines to handle one or more micro-mobility events involving one or more mobile nodes. While in one embodiment, access ports 212A-B are physical ports, in alternate embodiments, access ports 212A-B can be virtual ports or a mixture of physical and virtual ports.

By updating the state of the egress engine for a micro-mobility, less change to FA/ASN-GW forwarding plane 200 is done. This allows FA/ASN-GW 106 to redirect traffic to the mobile node quickly with less disruption to traffic forwarding for the mobile node than by reprogramming the entire forwarding plane.

Figure 3:
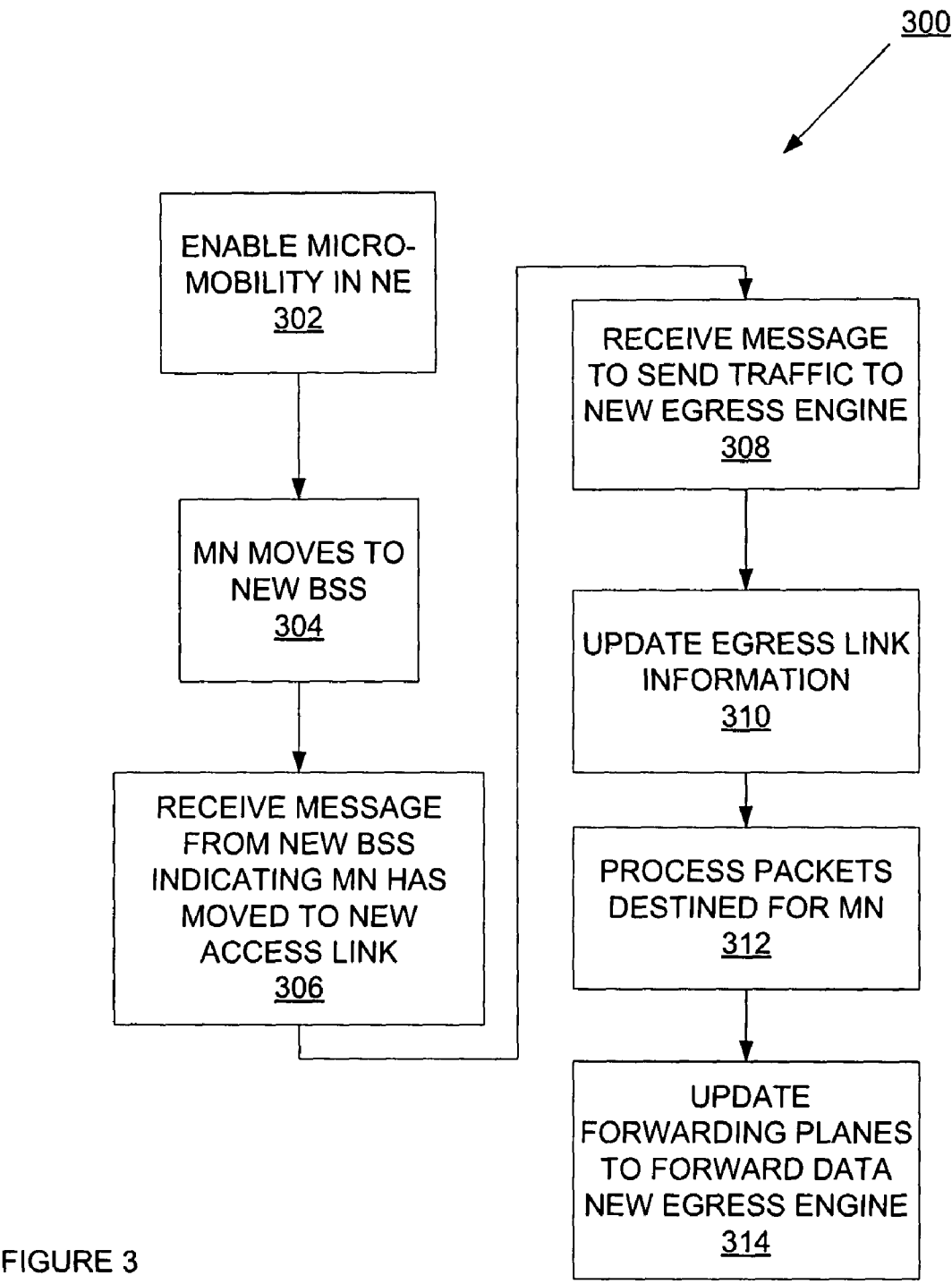
FIG. 3 is an exemplary flow diagram of a method for handling micro-mobility events according to one embodiment of the invention.

FIG. 3 is an exemplary flow diagram of a method 300 for handling micro-mobility events according to one embodiment of the invention. By way of illustration, FIG. 3 is described in reference to FIG. 2. In FIG. 3, at block 302, method 300 enables micro-mobility in the network element. In one embodiment, method 300 enables micro-mobility in FA/ASN-GW 106 by handling micro-mobility events in the forwarding plane of FA/ASN-GW 200. Enabling handling of micro-mobility events is further described in FIG. 4, below.

At block 304, method 300 detects movement of the mobile node to a different BSS. In one embodiment, mobile node signals to the new BSS that the mobile node wishes to access the network through this BSS.

At block 306, method 300 receives message from the new BSS indicating that the mobile node moved to a new access port. In one embodiment, FA/ASN-GW forwarding plane 200 receives a message at the new ingress engine from the new BSS indicating the mobile node is requesting that the new BSS and access port be used as access to the network for that mobile node. For example and by way of illustration, ingress engine 204A receives a request from mobile node A in position 206B that this node wants to access the network through BSS 104B and access port 212B. Receiving messages from BSS is further described in FIG. 5 below. In another embodiment, FA/ASN-GW forwarding plane 200 determines that the mobile node has moved by receipt of move message on access port 212B of FA/ASN-GW 106.

Method 300 receives a message to send traffic destined for the moved mobile mode to a new egress engine, at block 308. In one embodiment, method 300 receives a message that indicates the new egress engine associated with the mobile node's new position should handle traffic destined for that mobile node. For example and by way of illustration, egress engine 204A receives a message from ingress engine 202B that egress engine 204A should redirect packets destined for the mobile node A in position 206B to egress engine 204B. In one embodiment, mobile node is identified by key EK-O sent in the message from ingress engine 202B to egress engine 204A.

At block 310, method 300 updates egress link information to handle the moved mobile node. In one embodiment, method 300 adds a forwarding rule in the forwarding table of the old egress engine to forward packets destined for the moved mobile node to the new egress engine. As described above, adding the additional path appropriately forwards the traffic destined for the mobile node without reprogramming the all the egress and/or ingress engines in the forwarding plane. For example and by way of illustration, egress engine 204A updates its forwarding tables to indicate that packets destined for mobile node A in position 206B are to be sent to egress engine 204B. Updating egress link information is further described in FIG. 6 below.

Method 300 processes the packets destined for the moved mobile node at block 312. In one embodiment, method 300 receives packets destined for the mobile node at an ingress engine. The ingress engine determines which egress engine is associated with the mobile node. Because the control plane has not reconfigured the forwarding plane based on the mobility event associated with the moved mobile node, the ingress engine forward the packet to the old egress engine. Using the updated link information as described in block 310 above, the old egress engine redirects the packets to the new egress engine. The new egress engine forwards the packet to newly associated BSS for forwarding to the mobile node. Packet processing for the mobile node is further described in FIGS. 7-8 below.

At block 314, method 300 updates the forwarding plane so as to forward packets destined for the mobile node to the new egress engine. In one embodiment, the control plane of FA/ASN-GW 106 reprograms the FA/ASN-GW 200 forwarding plane 200 such that ingress engines 202A-C forward such packets to the new egress engine associated with the mobile node. In another embodiment, method 300 removes the transient forwarding information stored in the old egress engine. For example and by way of illustration, FA/ASN-GW 106 control plane reprograms FA/ASN-GW 200 by updating the forwarding tables associated with ingress 202A-C and egress 204A-C engines to reflect that mobile node A has moved to position 206B.

Figure 4:
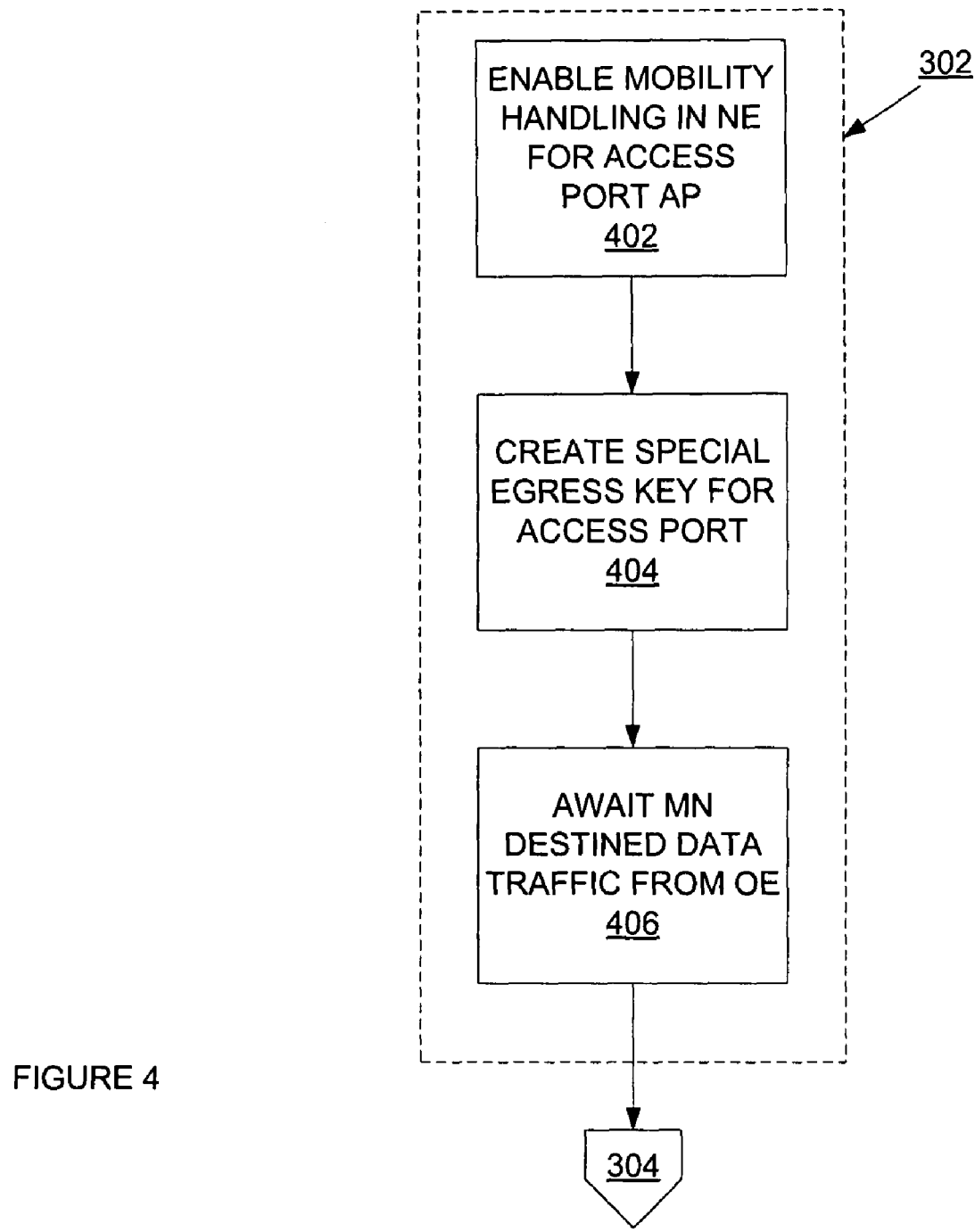
FIG. 4 is an exemplary flow diagram for preparing to receive a mobility event according to one embodiment of the invention.

FIG. 4 is an exemplary flow diagram of method 300 preparing to receive a mobility event according to one embodiment of the invention. In particular, FIG. 4 represents a further description of block 302. In FIG. 4, at block 402, method 300 enables mobility handling in the network element for access port AP. In one embodiment, method 300 enables mobility handling by FA/ASN-GW 106 control plane sending a control message to FA/ASN-GW forwarding plane 200 indicating one of access ports 212A-B should be treated as an access port for mobile nodes.

At block 404, method 300 creates a special egress key EK-S for access port AP. In one embodiment, egress key EK-S indicates the egress encapsulation process for sending packets through access port AP. While in one embodiment, the EK-S indicates a layer-2 encapsulation, in alternate embodiments, EK-S indicates another encapsulation known in the art (layer-3, etc.) While in one embodiment, egress key EK-S comprises access port specific information and lacks mobile node specific information, in alternate embodiments, egress key contains other information (slot and access port information, etc.) Method 300 waits for packets destined for the mobile node from the old egress engine at block 406.

Figure 5:
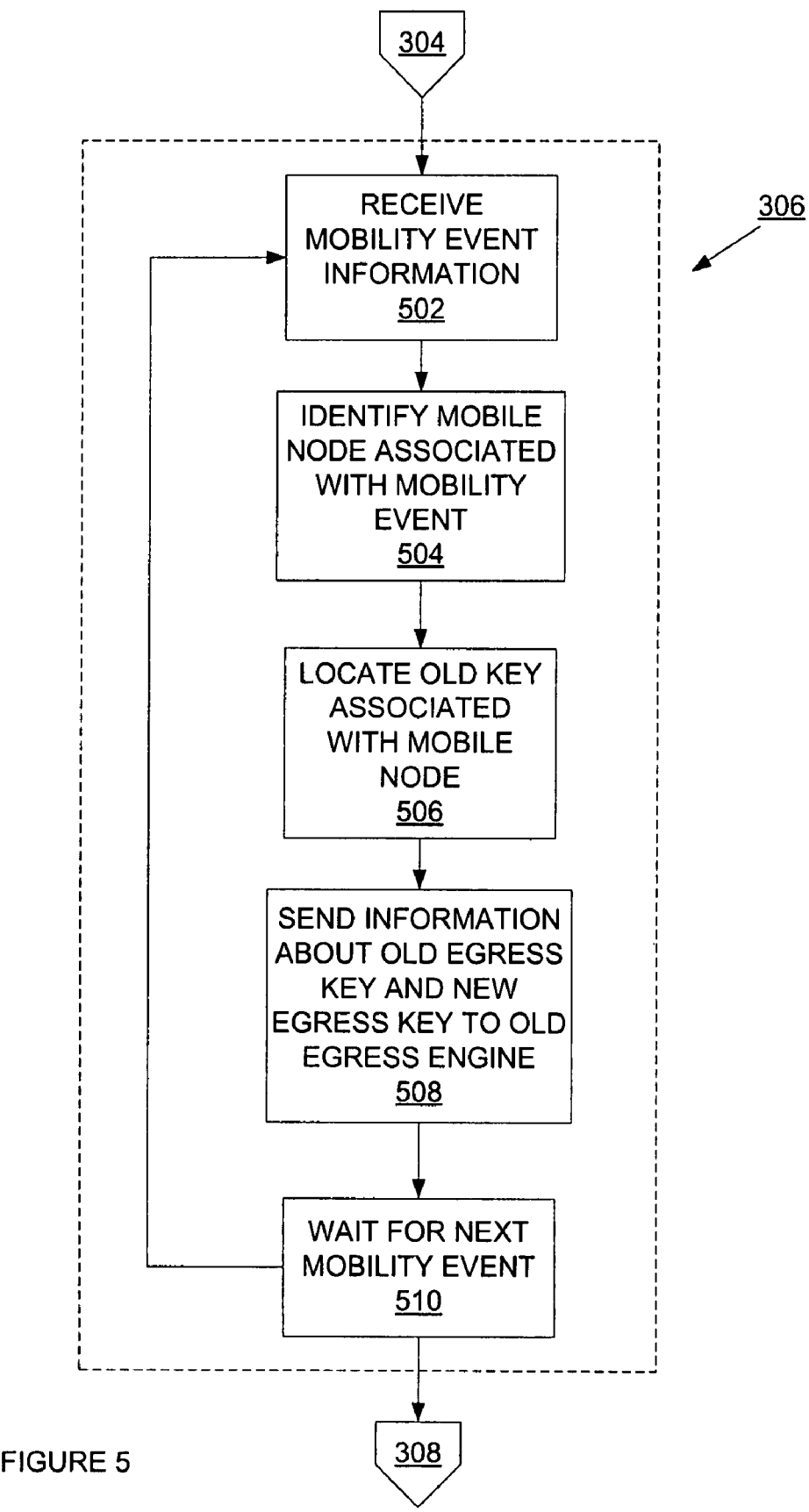
FIG. 5 is an exemplary flow diagram for receiving a mobility event according to one embodiment of the system.

FIG. 5 is an exemplary flow diagram of a method 300 for receiving a mobility event according to one embodiment of the invention. In particular, FIG. 5 represents a further description of block 306. In FIG. 5, at block 502, method 300 receives mobility event information at the ingress engine associated with the new access port coupled to the mobile node. In one embodiment, method 300 receives a Logical Link Control-eXchange Identification (LLC-XID) packet indicating that a mobile node has moved from one base station to another. An LLC-XID packet is an Ethernet layer-2 packet used to indicate a change in wireless access point. The base station system that gets the air interface handoff detects the micro-mobility event and sends an LLC-XID with the source Media Access Control (MAC) address of the mobile node. For example and by way of illustration, ingress engine 202B receives an LLC-XID packet via access port 212B from BSS 104B in response to mobile node A moving to position 206B. In alternate embodiment, method 300 receives a different type of packet indicating a mobile node has changed in base station systems.

At block 504, method 300 identifies the mobile node associated with the mobility event. In one embodiment, method 300 identifies the mobile node by the source MAC address associated with the received LLC-XID packet.

Method 300 locates the old key EK-O and old access port AP 212A associated with the mobile node at block 506. In one embodiment, method 300 locates EK-O and old access port AP 212A through a lookup of for the mobile identification by source MAC address. At block 508, method 300 sends information about the old key EK-O and new egress key EK-S to old egress engine. In one embodiment, EK-O comprises encapsulation information for transmitting packets out old access port AP 212A. While in one embodiment, EK-O is a lookup handle that references a data structure on a lookup, in alternate embodiments EK-O may additionally identify the old access slot and port. Method 300 waits for the next mobility event at block 510.

Figure 6:
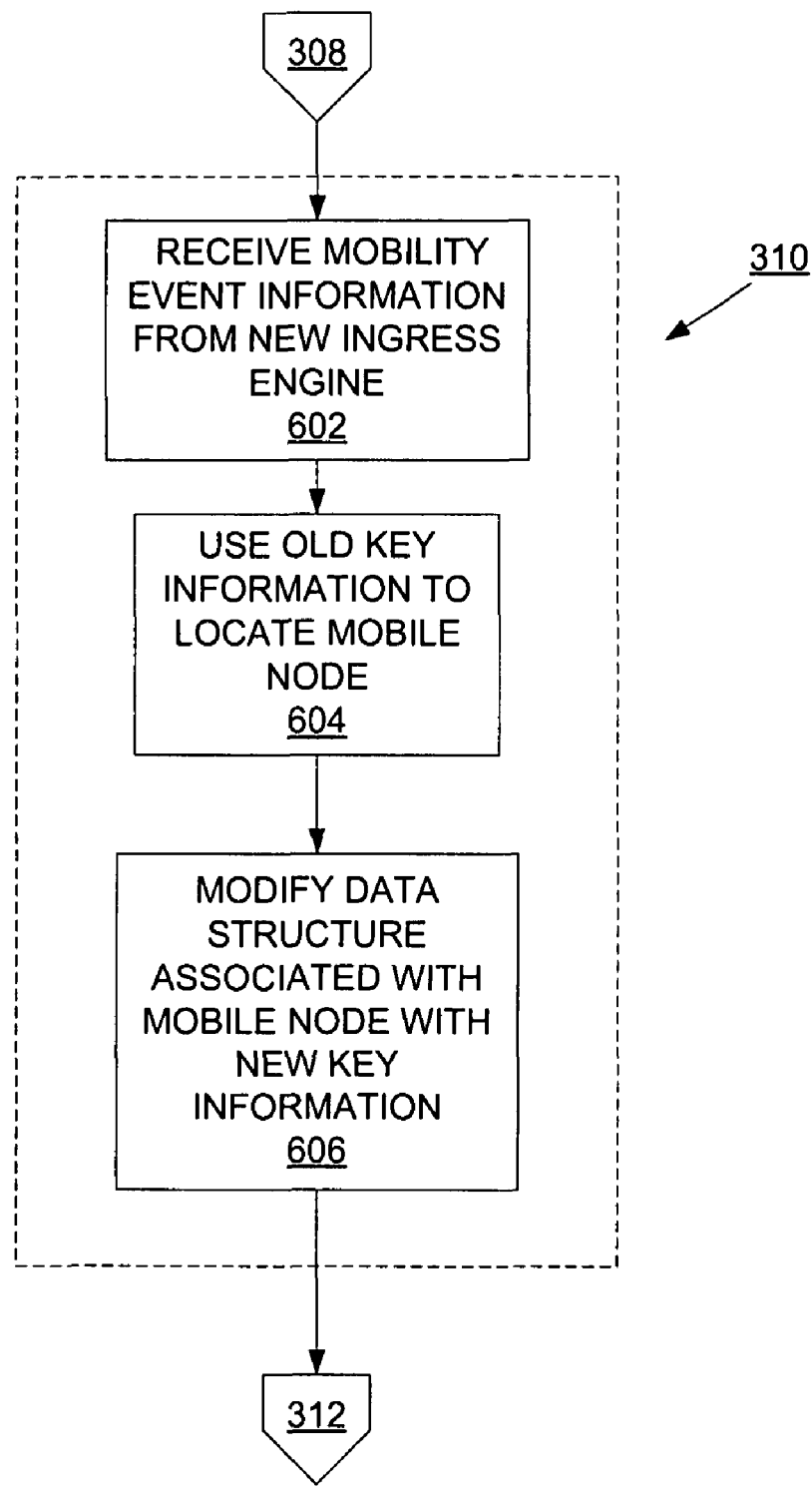
FIG. 6 is an exemplary flow diagram for updating the egress link information according to one embodiment of the system.

FIG. 6 is an exemplary flow diagram of a method 300 for updating the egress link information according to one embodiment of the invention. In particular, FIG. 6 represents a further description of block 310. In FIG. 6, at block 602, method 300 receives the mobility event information from the new egress information. In one embodiment, method 300 receives the old key EK-O and new egress key EK-S sent by the new ingress engine as described in FIG. 5 at block 508. At block 604, method 300 uses the information associated with EK-O to locate a data structure associated with the mobile node. In one embodiment, method 300 locates the mobile node data structure in the forwarding tables associated with the old egress engine. For example and by way of illustration, egress engine 204A looks up EK-O which egress engine 204A received in a message from ingress engine 202B. Method 300 updates this data structure with information associated with new special key EK-S so that the old egress engine redirects packets destined for the mobile node to the new egress engine. In this embodiment, the forwarding tables of the ingress engine are not modified, so the ingress engines continue to forward packets destined for the mobile node to the old egress engine. For example and by way of illustration, method 300 adds that forwarding path 210 from old egress engine 204A to new egress engine 204B. The forwarding tables of ingress engines 302A-C are not modified. Thus, in this example, packets destined for mobile node A in position 206B and received at ingress engines 202A-C are sent on paths 208A-C, respectively, to egress engine 204A. Egress engine 204A redirects those packets using the modified forwarding tables to egress engine 204B. In this embodiment, the updates allows FA/ASN-GW forwarding plane 300 to properly forward the packets destined for the mobile node in the new position without a complete reprogramming of the forwarding plane by the control plane.

Figure 7:
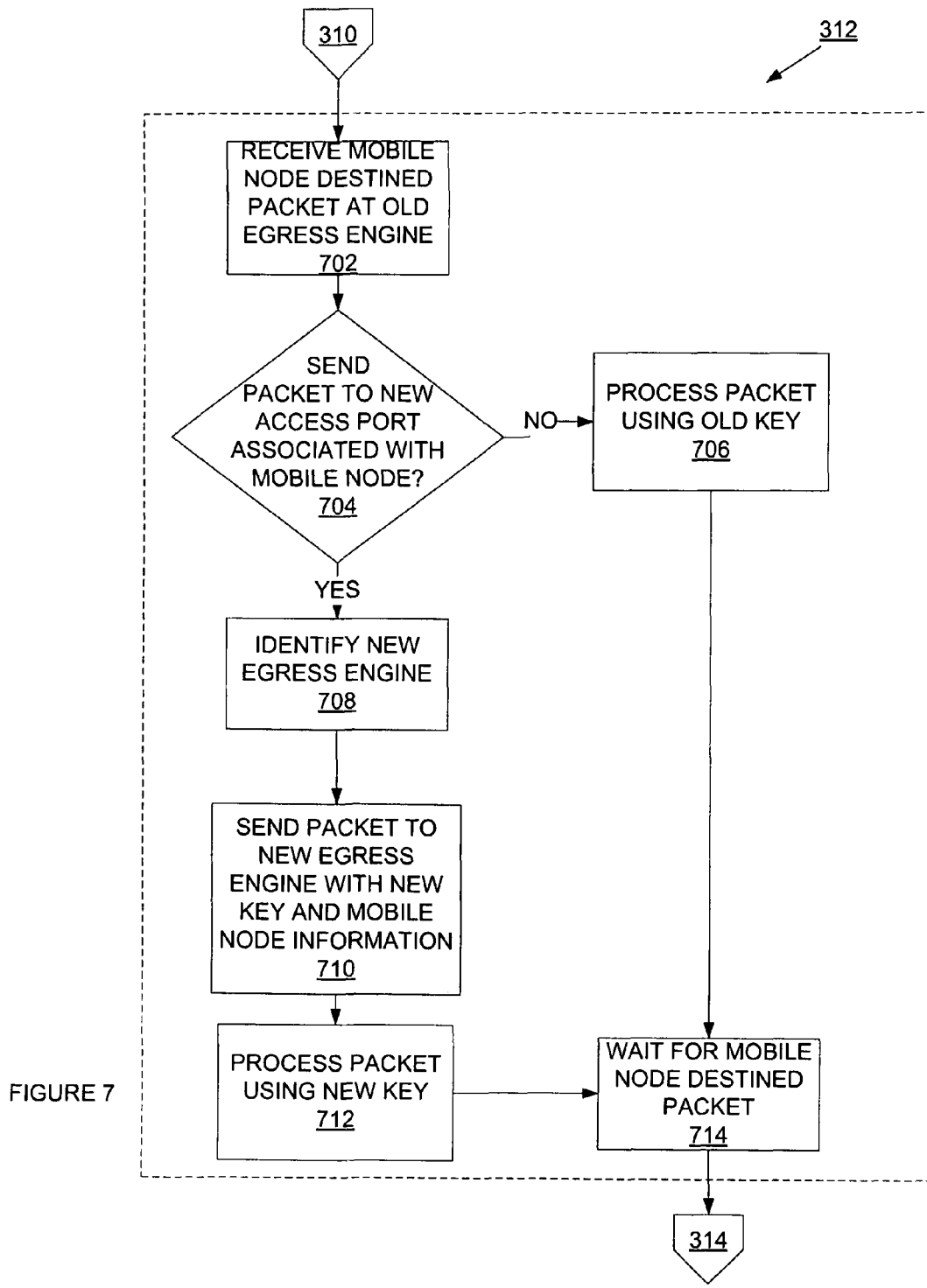
FIG. 7 is an exemplary flow diagram for processing packets destined for mobile node by the old egress engine according to one embodiment of the system.

FIG. 7 is an exemplary flow diagram of a method 300 for processing packets destined for mobile node by the old egress engine according to one embodiment of the invention. In particular, FIG. 7 represents a further description of block 312. In FIG. 7, at block 702, method 300 receives packets destined for the mobile node at the old egress engine. In one embodiment, method 300 receives packets destined for the mobile node from ingress engines that received these packets from HA/CSN 108 or the Internet. For example and by way of illustration, egress engine 204A receives packets destined for the mobile node from one or more of ingress engines 202A.

At block 704, method 300 determines if the packets should be sent to the new access port associated with the mobile node. In one embodiment, method 300 determines if the packet should be sent to the new access port by retrieving the data structure associated with the mobile node in the forwarding tables of the processing egress engine. In this embodiment, if the packet is to be sent to the new egress engine, the data structure indicates that the packet is redirected to new access port via the new egress engine. For example and by way of illustration, egress engine 204A determines this by looking up EK-O which is sent by ingress engines 202A-C along the mobile node destined packets. This lookup provides the data structure that indicates to redirect packets to access port 212B via egress engine 204B. The data structure includes mobile-subscriber specific information. If the packet is be sent through the old access port, method 300 processes the packet with the old key EK-O at block 706. Control proceeds to block 714 below.

If the packet is to be sent out the new access port, method 300 identifies the new egress engine. In one embodiment, method 300 identifies the new egress engine using the special key EK-S. Method 300 sends the packet to the new egress engine In one embodiment, method 300 sends the packet to the new ingress engine along with the special key EK-S and mobile node specific information, such as encapsulation information, MAC addresses, quality of service parameters, egress feature sets, etc. Method 300 processes the packet using the new key at block 712. In one embodiment, method 300 processes the packet by encapsulating the packet using information associated with the special key EK-S and the mobile node specific information sent to the new egress engine. Processing of the packet is further described in FIG. 8 below. At block 714, method 300 waits for another mobile node destined packet.

Figure 8:
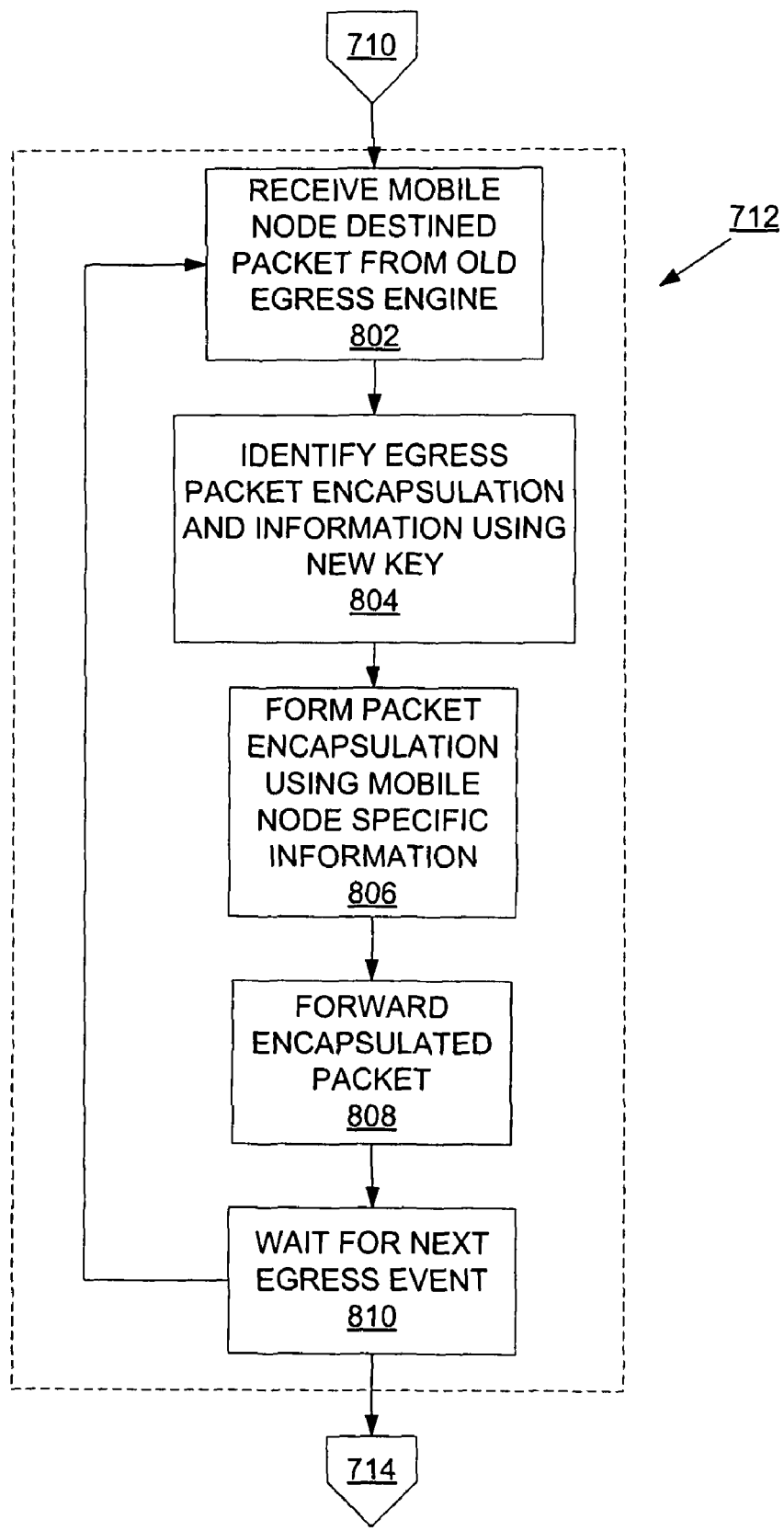
FIG. 8 is an exemplary flow diagram for processing packets destined for mobile node by the new egress engine according to one embodiment of the system.

FIG. 8 is an exemplary flow diagram of a method 300 for processing packets destined for mobile node by the new egress engine according to one embodiment of the invention. In particular, FIG. 8 represents a further description of block 712. In FIG. 8, at block 802, method 300 receives mobile node destined packets from the old egress engine. For example and by way of illustration, method 300 receives packets destined for mobile node A in position 206B from egress engine 204A via path 310. Method 300 identifies egress packet encapsulation and information using the new key EK-S at block 804.

At block 806, method 300 forms the appropriate packet encapsulation and applies the appropriate packet processing. While in one embodiment, method 300 forms a complete layer-2 packet encapsulation, in alternate embodiments, method 300 forms other packet encapsulation as is known in the art (layer-3, etc.). In one embodiment, method 300 applies packet processing as is known in the art (applying quality of service policies, traffic shaping, traffic policing, applying access control policies, apply firewall policies, packet translation, etc.). For example and by way of illustration, egress engine 204B forms the packet encapsulation and packet processing of packets destined for mobile node A in position 306B. Method 300 waits for the next egress event at block 810. While FIG. 8 has been described in reference to the new egress engine processing packets destined for the mobile node, in alternate embodiment, the old egress engine can apply the packet processing as described in the FIG. 8.

Figure 9:
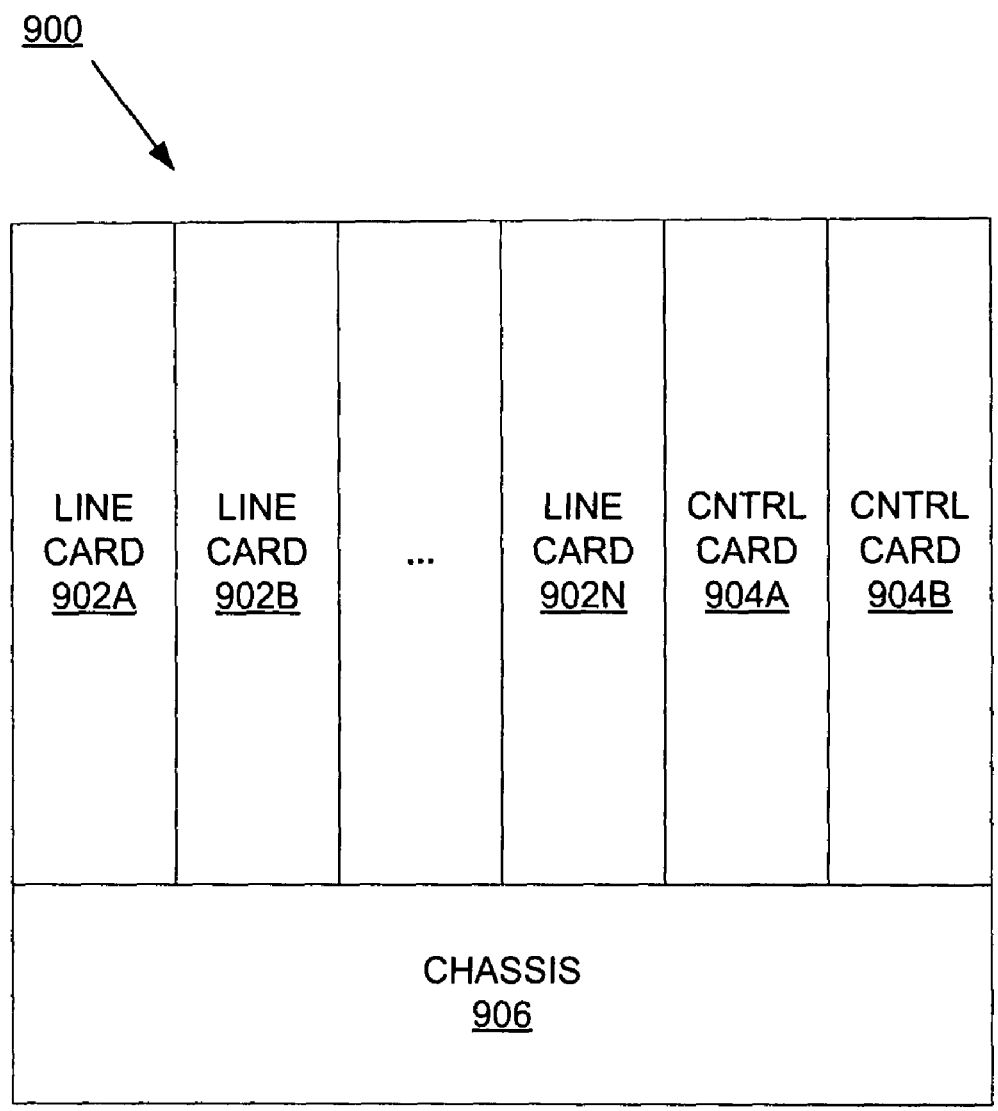
FIG. 9 is a block diagram illustrating an exemplary network element that handles mobility events according to one embodiment of the system.

FIG. 9 is a block diagram illustrating an exemplary network element 900 that handles mobility events according to one embodiment of the invention. In FIG. 9, backplane 906 couples to line cards 902A-N and controller cards 904A-B. While in one embodiment, controller cards 904A-B control the processing of the traffic by line cards 902A-N, in alternate embodiments, controller cards 904A-B perform the same and/or different functions (reprogram the line cards, upgrade software, handle operator requests, collect statistics, etc.). Line cards 902A-N process and forward traffic according to the policies received from controller cards 904A-B. In one embodiment, line cards 902A-N handle mobility events as described in FIG. 2.

Figure 10:
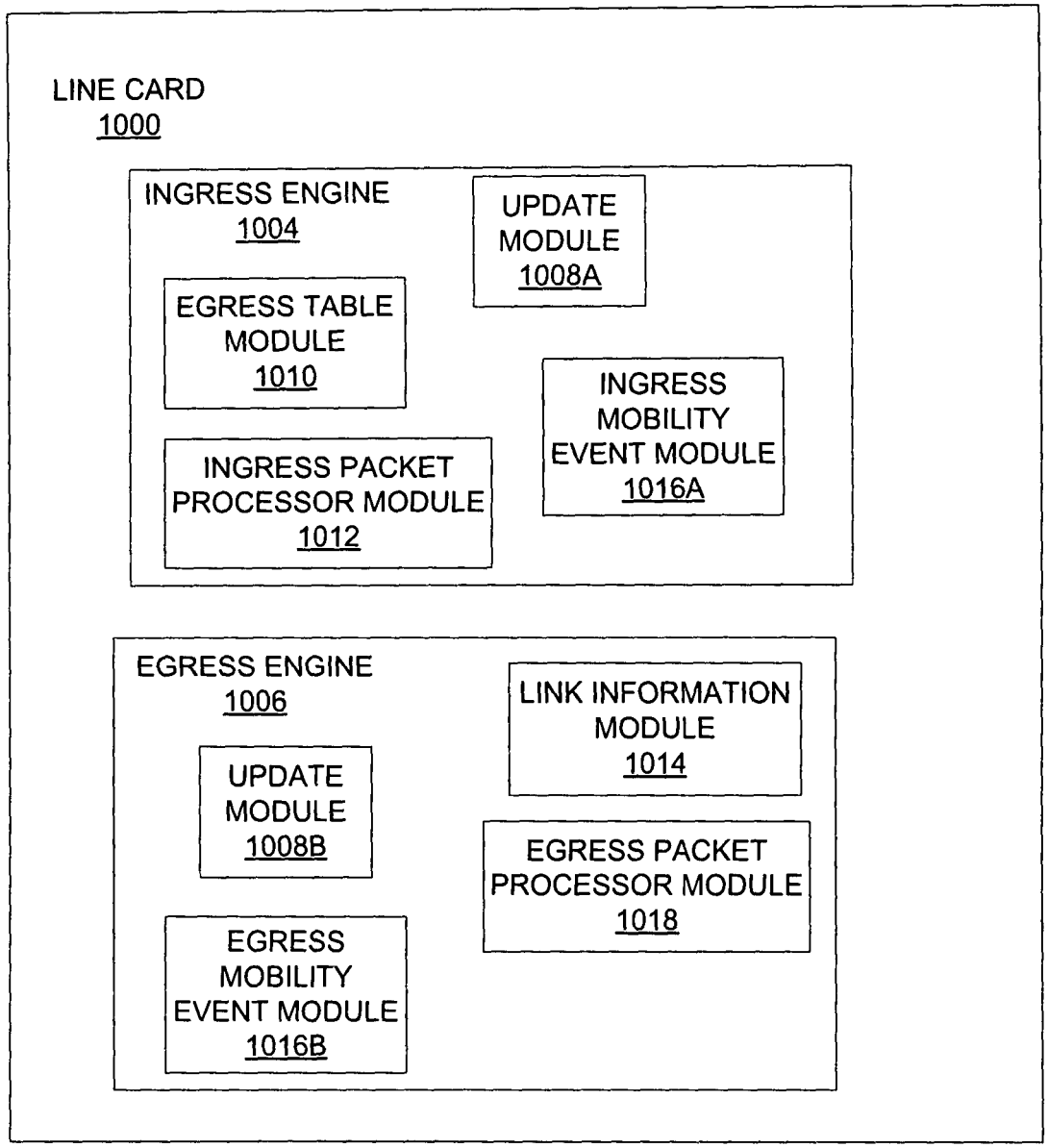
FIG. 10 is a block diagram illustrating an exemplary line card that handles mobility events according to one embodiment of the system.

FIG. 10 is a block diagram illustrating an exemplary line card 1000 that handles mobility events according to one embodiment of the invention. In FIG. 10, line card comprises ingress engine 1004 and egress engine 1006. While in one embodiment, ingress 1004 and egress 1006 engines have different modules and are different engines, in alternate embodiments, these engines can have the same modules and/or be the same engine. In one embodiment, ingress engine comprises update module 1008A, egress table module 1010, ingress packet processor 1012, and mobility event module 1016A. Egress comprises update module 1008B, link information module 10014, mobility event module 1016B, and egress packet processor module 1018.

Update modules 1008A-B updates forwarding table information for ingress 1004 and egress 1006 engines, respectively. In one embodiment, update module 1008A-B receives forwarding table updates to ingress 1004 and egress 1006 engines from the control plane and updates the respective engine forwarding tables as described in FIG. 3 at block 314 above. Egress table module 1010 receives messages to send traffic to the new egress engine as described in FIG. 3 at block 308. Ingress packet processor 1012 processes packets received by receiving line card and forwards these packets to the appropriate egress engine using the ingress forwarding tables.

Link information module 1014 updates the link information of the egress engine 1006 as described in FIG. 3 at block 310. Ingress mobility event module 1016A receives messages from the new base station system indicating the mobile node has moved a new access port as described in FIG. 3 at block 306. Egress mobility event module 1016B receives mobility event messages from the new ingress engine as described in FIG. 3, block 308. Egress packet processing module processes packet destined for the mobile node as described in FIG. 3 at block 312.

This implementation of the handling mobility events is an example, and not by way of limitation. Thus, network elements having other architectural configurations can incorporate embodiments of the invention. Examples of other network elements that could incorporate embodiments of the invention could have multiple line cards or have a single line card incorporating the functionality of both the ingress and egress engines. Moreover, a network element having the mobility event handling and response functionality distributed across the traffic cards could incorporate embodiments of the invention.

Controller cards 204A-B as well as line cards 202A-N included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Alternative Embodiments

While this invention has been described in reference to FA/ASN-GW 106, this invention is applicable to HA/CSN 108. In one embodiment, HA/CSN 108 implements method 300 to process micro-mobility changes from mobiles nodes accessing access ports coupled to HA/CSN 108.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a single network element, comprising:
    receiving a mobility message at the single network element indicating a mobile node has coupled to a new access port, wherein the mobility message further indicates that the mobile node moved from an old access port to the new access port, and wherein the single network element comprises the old and new access port;
    adding an entry in a forwarding table of the single network element, the entry associated with an old egress engine to redirect a set of packets destined to the mobile node to a new egress engine, wherein the new egress engine is associated with the new access port, wherein the forwarding is based on a special egress key associated with the new egress engine, wherein the special egress key indicates encapsulation and process information associated with the new access port; and
    forwarding the set of packets to the mobile node from the old egress engine via the new egress engine.

2. The method of claim 1, further comprising:
    receiving the set of packets at one or more ingress engines; and
    forwarding the set of packets to the old egress engine from the one or more ingress engines.

3. The method of claim 1, further comprising:
    creating the special egress key based on information associated with the new access port.

4. The method of claim 1, wherein receiving the mobility message is received at a new ingress engine associated with the new access port.

5. The method of claim 4, further comprising:
    sending a forwarding message to the old egress engine, wherein the forwarding message indicates to forward the set of packets to the new egress engine.

6. A machine-readable medium that stores instructions, which when executed by a set of one or more processors in a single network element, cause said set of processors to perform operations comprising:
    receive a mobility message at the single network element indicating a mobile node has coupled to a new access port, wherein the mobility message further indicates that the mobile node moved from an old access port to the new access port, and wherein the single network element comprises the old and new access port;
    add an entry in a forwarding table of the single network element, the entry associated with an old egress engine to redirect a set of packets destined to the mobile node to a new egress engine, wherein the new egress engine is associated with the new access port, wherein the forwarding is based on a special egress key associated with the new egress engine, wherein the special egress key indicates encapsulation and process information associated with the new access port; and forward the set of packets to the mobile node from the old egress engine via the new egress engine.

7. The machine-readable medium of claim 6, wherein the operations further comprising:
receive the set of packets at one or more ingress engines; and
forward the set of packets to the old egress engine from the one or more ingress engines.

8. The machine-readable medium of claim 6, wherein the operations further comprising:
create the special egress key based on information associated with the new access port.

9. The machine-readable medium of claim 6, wherein the mobility message is received at a new ingress engine associated with the new access port.

10. The machine-readable medium of claim 9, wherein the operations further comprising:
send a forwarding message to the old egress engine, wherein the forwarding message indicates to forward the set of packets to the new egress engine.

11. A network comprising:
a mobile node; and
a single network element comprising:
  a plurality of access ports,
  a set of one or more ingress engines, wherein one of the set of one or more ingress engines receives a mobility message indicating the mobile node has coupled to a new one of the plurality of access ports, wherein the mobility message further indicates that the mobile node moved from an old one of the plurality of access ports to the new access port, and
  a plurality of egress engines, wherein one of the plurality of egress engines that is associated with the old one of the plurality of access ports adds an entry in a forwarding table to redirect a set of packets destined to the mobile node to the new one of the plurality of egress engines, wherein the new one of the plurality of egress engines is associated with the new one of the plurality of access ports, and wherein the old one of the plurality of egress engines forwards the set of packets to the mobile node via the new one of the plurality of egress engines and wherein the forwarding is based on a special egress key associated with the new one of the plurality of egress engines, wherein the special egress key indicates encapsulation and process information associated with the new one of the plurality of the access ports.

12. The network of claim 11, wherein at least one of the set of one or more ingress engines receives the set of packets and the at least one of the set of one or more ingress engines forwards the set of packets to the old one of the plurality of egress engines.

13. The network of claim 11, wherein the network element creates the special egress key based on information associated with the new one of the plurality of access ports.

14. The network of claim 11, wherein a new one of the set of one or more of ingress engines associated with the new one of the plurality of access ports receives the mobility message.

15. The network of claim 14, wherein the new one of the set of one or more of ingress engines sends a forwarding message to the old one of the plurality of egress engines, wherein the forwarding message indicates to redirect the set of packets to the new one of the plurality of egress engines.

* * * * *

UNITED STATES PATENT AND TRADEMARK OFFICE
CERTIFICATE OF CORRECTION

| | |
|---|---|
| PATENT NO. | : 7,986,667 B2 |
| APPLICATION NO. | : 11/975486 |
| DATED | : July 26, 2011 |
| INVENTOR(S) | : Lakshmikanthan et al. |

Page 1 of 1

It is certified that error appears in the above-identified patent and that said Letters Patent is hereby corrected as shown below:

On the Title Page, item (12), under "United States Patent", in Column 1, Line 2, delete "Lakshmikathan" and insert -- Lakshmikanthan --, therefor.

On the Title Page, item (75), under "Inventors", in Column 1, Line 1, delete "Lakshmikathan," and insert -- Lakshmikanthan, --, therefor.

In Column 8, Line 11, delete "engine" and insert -- engine. --, therefor.

Signed and Sealed this
Twenty-seventh Day of December, 2011

David J. Kappos
*Director of the United States Patent and Trademark Office*